(12) United States Patent
Sato et al.

(10) Patent No.: US 9,007,721 B2
(45) Date of Patent: Apr. 14, 2015

(54) MICROWAVE ASSISTED MAGNETIC RECORDING HEAD HAVING SPIN TORQUE OSCILLATOR, AND MAGNETIC RECORDING APPARATUS

(71) Applicant: Hitachi, Ltd., Tokyo (JP)

(72) Inventors: Yo Sato, Odawara (JP); Katsuro Watanabe, Hitachiota (JP); Keizou Katou, Hachioji (JP); Masukazu Igarashi, Kawagoe (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/957,464

(22) Filed: Aug. 2, 2013

(65) Prior Publication Data

US 2014/0036387 A1 Feb. 6, 2014

(30) Foreign Application Priority Data

Aug. 2, 2012 (JP) ................................. 2012-172200

(51) Int. Cl.
  *G11B 5/31* (2006.01)
  *G11B 5/17* (2006.01)
  *G11B 5/02* (2006.01)
  *G11B 5/00* (2006.01)

(52) U.S. Cl.
  CPC ............... *G11B 5/17* (2013.01); *G11B 5/3146* (2013.01); *G11B 2005/0024* (2013.01)

(58) Field of Classification Search
  USPC .............................................. 360/125.3, 128
  See application file for complete search history.

(56) References Cited

U.S. PATENT DOCUMENTS

| 8,274,811 | B2 * | 9/2012 | Zhang et al. | 365/145 |
| 8,467,149 | B2 * | 6/2013 | Takeo et al. | 360/125.3 |
| 8,488,373 | B2 * | 7/2013 | Zhang et al. | 365/158 |
| 8,537,497 | B2 * | 9/2013 | Nagasaka et al. | 360/125.3 |
| 2012/0126905 | A1 * | 5/2012 | Zhang et al. | 331/94.1 |

(Continued)

FOREIGN PATENT DOCUMENTS

| JP | 6-243527 | 9/1994 |
| JP | 2011238932 A * | 11/2011 |

(Continued)

OTHER PUBLICATIONS

Xiaochun Zhu et al., Bias-Field-Free Microwave Oscillator driven by Perpendicularly Polarized Spin Current, IEEE Transactions on Magnetics, Oct. 2006, vol. 42, No. 10., p. 2670-2672.

(Continued)

*Primary Examiner* — Will J Klimowicz
(74) *Attorney, Agent, or Firm* — Baker Botts L.L.P.

(57) ABSTRACT

A spin torque oscillator is provided which is adapted to high data transfer rates and which can perform assisted magnetic recording of sufficient magnitude. A spin torque oscillator is provided with a stacked spin injection layer and a high frequency magnetic field generation layer. The stacked spin injection layer has a stacked structure in which a first magnetic layer, a coupling layer, and a second magnetic layer are stacked in the order mentioned from a far side as viewed from the high frequency magnetic field generation layer. Magnetization of the first magnetic layer and magnetization of the second magnetic layer are coupled antiparallel to each other. A polarity of the magnetization of the second magnetic layer is reversed temporally earlier than a magnetic field polarity reversal of a leakage magnetic field from the main magnetic pole.

4 Claims, 7 Drawing Sheets

(56) References Cited

U.S. PATENT DOCUMENTS

| | | | |
|---|---|---|---|
| 2013/0029035 A1* | 1/2013 | Zhang et al. | 427/130 |
| 2013/0029182 A1* | 1/2013 | Zhang et al. | 428/811.1 |
| 2013/0050869 A1* | 2/2013 | Nagasaka et al. | 360/75 |
| 2014/0104724 A1* | 4/2014 | Shiroishi et al. | 360/75 |

FOREIGN PATENT DOCUMENTS

| | | | |
|---|---|---|---|
| JP | 2012114364 A | * | 6/2012 |
| JP | 2012114441 A | * | 6/2012 |
| JP | 5048859 B1 | * | 10/2012 |
| JP | 2013048000 A | * | 3/2013 |

OTHER PUBLICATIONS

Jian-gang (Jimmy) Zhu et al., Microwave Assisted Magnetic Recording (MAMR), Data Storage Systems Center, Carnegie Mellon University, Department of Electrical and Computer Engineering, Carnegie Mellon University, Pittsburgh, PA. e-mail jzhu@ece.cmu.edu, The Magnetic Recording Conference (TMRC) 2007 Paper B6.
J. Zhu et al., Microwave Assisted Magnetic Recording with Circular AC Field Generated by Spin Torque Transfer, Electrical and Computer Engineering, Carnegie Mellon University, Pittsburgh, PA, MMM Conference 2008 Paper GA-02 (2008), Symposium on Microwave Assisted Magnetization Reversal, Nov. 14, 2008, Kristen Buchanan, Chair.

* cited by examiner

Hkeff2 (kOe)

| Hkeff1 (kOe) | 0 | 1 | 2 | 3 | 4 | 5 | 6 | 7 | 8 | 9 |
|---|---|---|---|---|---|---|---|---|---|---|
| 0 | X | X | X | X | X | X | X | X | X | X |
| 1 | O | O | O | O | X | X | X | X | X | X |
| 2 | O | O | O | O | O | X | X | X | X | X |
| 3 | O | O | O | O | O | O | X | X | X | X |
| 4 | O | O | O | O | O | O | O | X | X | X |
| 5 | O | O | O | O | O | O | O | O | X | X |
| 6 | O | O | O | O | O | O | O | O | O | X |
| 7 | O | O | O | O | O | O | O | O | O | O |
| 8 | O | O | O | O | O | O | O | O | O | O |
| 9 | O | O | O | O | O | O | O | O | O | O |

FIG. 7

Hkeff2 (kOe)

| Hkeff1 (kOe) | 0 | 1 | 2 | 3 | 4 | 5 | 6 | 7 | 8 | 9 |
|---|---|---|---|---|---|---|---|---|---|---|
| 0 | X | X | X | X | X | X | X | X | X | X |
| 1 | O | X | X | X | X | X | X | X | X | X |
| 2 | O | O | X | X | X | X | X | X | X | X |
| 3 | O | O | O | X | X | X | X | X | X | X |
| 4 | O | O | O | O | X | X | X | X | X | X |
| 5 | O | O | O | O | O | X | X | X | X | X |
| 6 | O | O | O | O | O | O | X | X | X | X |
| 7 | O | O | O | O | O | O | O | X | X | X |
| 8 | O | O | O | O | O | O | O | O | X | X |
| 9 | O | O | O | O | O | O | O | O | O | X |

MICROWAVE ASSISTED MAGNETIC RECORDING HEAD HAVING SPIN TORQUE OSCILLATOR, AND MAGNETIC RECORDING APPARATUS

CLAIM OF PRIORITY

The present application claims priority from Japanese patent application JP 2012-172200 filed on Aug. 2, 2012, the content of which is hereby incorporated by reference into this application.

TECHNICAL FIELD

The present invention relates to a spin torque oscillator and a magnetic recording head which are adapted to high data transfer rates and which can perform assisted magnetic recording of sufficient magnitude, and to a magnetic recording apparatus equipped with the magnetic recording head.

RELATED ART

In recent years, spin electronics elements, such as a TMR (Tunneling Magneto Resistance) head used in a HDD (Hard Disk Drive) reproducing head and a spin injection MRAM (Magnetic Random Access Memory), have been making great contributions to the development of information technology. The development of such spin electronics elements has led to the discovery of a spin torque oscillator that generates microwaves by causing a magnetic material to oscillate by using spin torque, and a spin torque diode effect by which high frequency current is rectified, and their potential applications are increasingly becoming wider, including high frequency generation, detection, modulation, and amplification. In particular, the application of a spin torque oscillator to HDDs is gaining much attention as a means to achieve future high recording densities. In the following, problems that increasing the recording density of HDD faces and methods for solving the problems to achieve higher recording density will be described as a background.

As the recording density of HDDs increases, the bit size of the recording media is becoming increasingly smaller year by year. As the bit size becomes smaller, the loss of a recording state due to thermal fluctuation is creating a concern. In order to overcome such a problem and enable a recording bit to be stably maintained by the future high density recording, it is necessary to use a recording medium with high coercive force, i.e., high magnetic anisotropy. However, performing recording in a recording medium with high coercive force requires a strong recording field. In practice, however, there is an upper limit to the recording field strength because of the narrowing of the recording head and limitations of available magnetic materials. For these reasons, the coercive force of the recording medium is constrained by the magnitude of the recording field that can be generated by the recording head. In order to address the competing demands for high thermal stability of the medium and a coercive force that facilitates recording, recording techniques have been devised by which the coercive force of the recording medium is effectively lowered only during recording by using various auxiliary means. A representative example is thermally assisted recording by which recording is performed by using a magnetic head and a heating means, such as a laser, in combination.

Meanwhile, an idea exists to perform recording while the coercive force of the recording medium is locally decreased by using a high frequency magnetic field in combination with the recording field from the recording head. For example, Patent Document 1 discloses a technique for recording information by locally decreasing the medium coercive force by heating the magnetic recording medium by Joule heating or magnetic resonance using a high frequency magnetic field. In the recording technique that utilizes the magnetic resonance of a high frequency magnetic field and the magnetic head field (hereafter referred to as "microwave assisted recording"), because of the use of magnetic resonance, a large high frequency magnetic field proportional to the magnetic anisotropy field of the medium needs to be applied in order to obtain the effect of lowering the switching magnetic field.

In recent years, the principle of generating high frequency magnetic field by using spin torque, as in a spin torque oscillator, has been proposed, and microwave assisted recording has become more realistic. For example, Non-patent Document 1 discloses calculation results concerning a spin torque oscillator that oscillates without an external bias magnetic field. Non-patent Document 2 discloses a technique for recording information in a magnetic recording medium with large magnetic anisotropy by which a microwave (high frequency magnetic field) is generated by a field generation layer (FGL) with high speed magnetization rotation based on spin torque which is disposed in the vicinity of the magnetic recording medium adjacent to the main magnetic pole of a perpendicular magnetic head. Further, Non-patent Document 3 presents a spin torque oscillator such that the rotating direction of the FGL is controlled by utilizing a leakage magnetic field from a main magnetic pole in proximity to the FGL, whereby microwave assisted magnetization reversal in the medium is described to be achieved efficiently.

PRIOR ART DOCUMENTS

Patent Document 1: JP 6-243527 A
Non-patent Document 1: X. Zhu and J. G. Zhu, "Bias-Field-Free Microwave Oscillator Driven by Perpendicularly Polarized Spin Current", IEEE TRANSACTIONS ON MAGNETICS, P2670, VOL. 42, NO. 10 (2006)
Non-patent Document 2: J. G. Zhu and X. Zhu, "Microwave Assisted Magnetic Recording", The Magnetic Recording Conference (TMRC) 2007 Paper B6 (2007)
Non-patent Document 3: J. Zhu and Y. Wang, "Microwave Assisted Magnetic Recording with Circular AC Field Generated by Spin Torque Transfer", MMM Conference 2008 Paper GA-02(2008)

SUMMARY OF THE INVENTION

Problems to be Solved by the Invention

As recording density is increased, data transfer rate also increases. As a result, the magnetization polarity reversal speed of the main magnetic pole is also increased, and it is believed that the transfer speed of 1 GHz or higher is required as the speed for rewriting magnetization by the magnetic recording head at recording densities higher than 1 Tb/in$^2$. Currently, it is believed that, as a spin torque oscillator for microwave assisted recording, the system by which magnetization reversal of a spin injection layer occurs in accordance with the speed of magnetization reversal of the main magnetic pole is efficient. Thus, it is believed that, for the spin injection layer of a spin torque oscillator in which magnetization reversal needs to be caused in synchronism with the leakage magnetic field from the main magnetic pole, the speed of magnetization reversal needs to be within approximately 200 ps to match the rise speed of the magnetic field of the main magnetic pole.

Particularly, in a spin torque oscillator having a perpendicular magnetization film in the spin injection layer, because of the coercive force of the perpendicular magnetization film, magnetization reversal of the spin injection layer does not start until the polarity of the leakage magnetic field from the main magnetic pole is reversed and further a leakage magnetic field exceeding the coercive force is generated. As a result, the spin torque oscillator enters an oscillation-enabled magnetization state after a time delay from the magnetization reversal of the main magnetic pole. In such a condition, a recording bit cannot be irradiated with the high frequency magnetic field for assisted magnetic recording for a sufficiently long time, and therefore a sufficient assisted magnetic recording effect cannot be obtained.

As a means for increasing the speed of magnetization reversal of the spin injection layer, the leakage magnetic field from the main magnetic pole that is applied to the spin injection layer may be increased, the magnetic anisotropy of the spin injection layer may be decreased, or a demagnetization field may be increased. However, it is difficult to infinitely increase the leakage magnetic field because of the constraint of using the leakage magnetic field from the main magnetic pole for magnetization reversal, and high speed magnetization reversal under the constraint of the leakage magnetic field strength of within approximately 15 kOe is desirable. Further, when the magnetic anisotropy of the spin injection layer is decreased, spin torque tolerance is lowered, so that the spin injection layer does not function as such for the spin torque oscillator.

An object of the present invention is to solve the above problems and provide a spin torque oscillator having a spin injection layer with sufficiently high spin torque tolerance and adapted to high speed magnetization reversal, a magnetic recording head, and a magnetic recording apparatus.

Solution to the Problems

According to the present invention, a magnetic recording head includes a main magnetic pole that generates a recording field and a spin torque oscillator. The spin torque oscillator includes a stacked spin injection layer and a high frequency magnetic field generation layer. The stacked spin injection layer has a stacked structure including a first magnetic layer, a coupling intermediate layer, and a second magnetic layer that are stacked in the order mentioned from a far side as viewed from the high frequency magnetic field generation layer. Magnetization of the first magnetic layer and magnetization of the second magnetic layer are coupled antiparallel to each other. A polarity of the magnetization of the second magnetic layer is reversed temporally earlier than a magnetic field polarity reversal of a leakage magnetic field from the main magnetic pole.

The first magnetic layer and the second magnetic layer of the stacked spin injection layer may satisfy the following relationship:

$$Bs1 \times t1 \geq Bs2 \times t2 \text{ and } Hk_{\mathit{eff1}} > Hk_{\mathit{eff2}}$$

where $Bs1 \times t1$ is the product of a saturation magnetic flux density and a film thickness of the first magnetic layer, $Bs2 \times t2$ is the product of a saturation magnetic flux density and a film thickness of the second magnetic layer, $Hk_{\mathit{eff1}}$ is an effective magnetic anisotropy field of the first magnetic layer, and $Hk_{\mathit{eff2}}$ is an effective magnetic anisotropy field of the second magnetic layer.

Effect of the Invention

According to the present invention, the polarity of magnetization of the stacked spin injection layer is reversed temporally earlier than a magnetic field polarity reversal of the leakage magnetic field from the main magnetic pole. Thus, a recording bit can be given an assist effect by the high frequency magnetic field for a duration of time longer than conventionally by the order of several dozen ps, even at a write speed exceeding 1 GHz. As a result, an error rate improvement can be achieved and magnetic recording with a higher recording density can be realized.

Other problems, configurations, or effects will become apparent from the following description of embodiments.

MODE FOR CARRYING OUT THE INVENTION

In the following, embodiments of the present invention will be described with reference to the drawings.

First Embodiment

Figure 1:
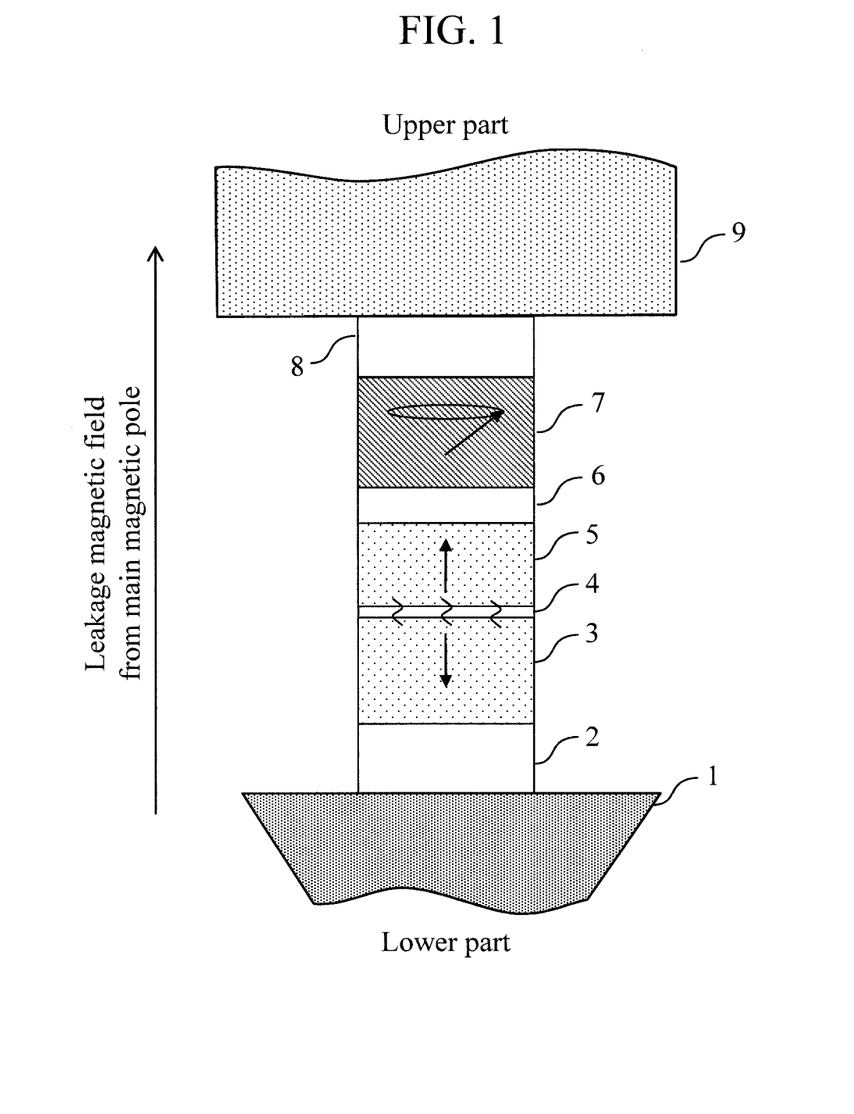
FIG. 1 schematically shows an example of a magnetic recording head according to the present invention.

FIG. 1 is a schematic view of an example of a magnetic recording head according to the present invention, showing an enlarged view of a spin torque oscillator portion.

As the material for the main magnetic pole 1, CoFeNi with the saturation magnetic flux density Bs of 2.4 T was used to ensure high recording field strength. The stacked layers from an underlayer 2 through a capping layer 8 were formed in one batch by sputtering in a vacuum. In the following, the materials used will be described in order of stacking.

For the underlayer 2, any material that can cause perpendicular magnetic anisotropy of the first magnetic layer 3 to be expressed may be used. According to the present embodiment, Pt (10) was used. The value in the parentheses indicates the film thickness in units of nanometers. Other than this, Cr, Ru, Ir, Cu, Pt, and the like may be used. The thickness of the underlayer 2 needs to be such that the magnetic coupling of the main magnetic pole 1 and the first magnetic layer 3 can be suppressed so that the crystalline continuity of the main magnetic pole 1 can be reset, and needs to be at least 0.5 nm or more. By varying the thickness of the underlayer 2, the distance between the main magnetic pole 1 and a high frequency magnetic field generation layer (hereafter referred to as "oscillation layer") 7 can be adjusted. In such a case, an arrangement is adopted such that magnetization reversal of the medium can be most efficiently promoted by the superimposed magnetic field strength or gradient of a high frequency magnetic field from the oscillation layer 7 and a recording field from the main magnetic pole 1. If the distance between the main magnetic pole 1 and the oscillation layer 7 is too far, efficiency is lowered. Thus, in order to efficiently cause the expression of the microwave assist effect by the superimposed magnetic field strength or gradient, the thickness of the underlayer 2 is preferably set to be not more than 20 nm.

According to the present embodiment, as the first magnetic layer 3, an artificial lattice thin film comprising 10 alternate layers of Co (0.2) and Ni (0.4) was used. The fabricated perpendicular magnetization film had a magnetic anisotropy of 15 kOe in a perpendicular direction with respect to the film plane, and a saturation magnetic flux density of 1.1 T (875 emu/cc). Herein, the sum of a crystalline magnetic anisotropy magnetic field and a shape magnetic anisotropy magnetic field is defined as an effective magnetic anisotropy field. In light of the demagnetization field in the film thickness direction (shape anisotropy), the effective magnetic anisotropy $Hk_{eff1}$ of the first magnetic layer 3 is approximately 4 kOe. Other than the above, the material for the first magnetic layer 3 may include materials having perpendicular magnetic anisotropy such as an alloy having perpendicular magnetic anisotropy comprising a Co/Ni multilayer film to which Pt or Pd is added as a third element, and a multilayer stacked film of Co/Pt or Co/Pd.

For the coupling layer 4 stacked thereon, a material that can cause an antiferromagnetic coupling of the first magnetic layer 3 and the second magnetic layer 5 may be used. According to the present embodiment, Ru (0.8) was used. In this case, the antiparallel coupling strength via Ru was 1 erg/cm$^2$.

When Ru was used, the maximum antiparallel coupling strength was obtained when the film thickness was 0.4 nm, and the coupling strength in this case was 4 erg/cm$^2$. When the antiparallel coupling strength via Ru is large, a behavior such that the first magnetic layer 3 and the second magnetic layer 5 would achieve an energy balance by facing mutually diagonal directions with respect to the leakage magnetic field from the main magnetic pole 1 is observed, where the second magnetic layer 5 is not oriented in a desired direction as a spin injection layer. Thus, when a 180° high speed magnetization reversal is expected, the antiparallel coupling strength is preferably suppressed to 2 erg/cm$^2$ or less.

According to the present embodiment, as the second magnetic layer 5 stacked on the coupling layer 4, an artificial lattice thin film comprising five alternate layers of Co (0.3) and Ni (0.3) was used. The fabricated perpendicular magnetization film had a magnetic anisotropy of 13 kOe in a perpendicular direction with respect to the film plane, and the saturation magnetic flux density was 1.3 T (1035 emu/cc). In light of the demagnetization field in the film thickness direction, the effective magnetic anisotropy $Hk_{eff2}$ of the second magnetic layer 5 is approximately 0 kOe. Other than the above, the material for the second magnetic layer 5 may include materials having perpendicular magnetic anisotropy, such as an alloy having perpendicular magnetic anisotropy comprising a Co/Ni multilayer film to which Pt or Pd is added as a third element, and a multilayer stacked film of Co/Pt or Co/Pd.

For the spin conduction layer 6 stacked on the second magnetic layer 5, a material with a long spin diffusion length may be used. While Cu (3) was used according to the present embodiment, other metal materials, such as Au and Ag, may be used. When a metal material is used, a thin film can be obtained to the extent that the second magnetic layer 5 and the oscillation layer 7 are not ferromagnetically coupled to exhibit an integrated magnetization behavior; the magnetic coupling can be made sufficiently small when the film thickness is not less than 0.5 nm. While the film thickness can be increased within the range of the spin diffusion length for each material, the film thickness may be decreased as much as possible in order to maximize the spin injection efficiency, preferably to 5 nm or less.

It is also possible to construct a spin torque oscillator utilizing TMR. In this case, it is preferable to form, as the spin conduction layer 6, an insulating layer from which a large spin-dependent tunneling phenomenon can be expected, such as Al—O, Mg—O, and Zn—O. When an insulating layer is used as the spin conduction layer 6, a smaller film thickness is preferable from the viewpoint of achieving higher spin injection efficiency with a large current density because the element resistance increases exponentially as the film thickness is increased. Preferably, a film thickness in the range of from 0.4 nm, which is the minimum film thickness for providing the insulating layer function, to 2 nm may be used.

As the oscillation layer 7 stacked on the spin conduction layer 6, $Co_{50}Fe_{50}(10)$ was formed. The suffix to the material denotes the composition of the material in at %. As the material for the oscillation layer 7, compositions or materials other than $Co_{50}Fe_{50}$ may be used to form a relatively high-Bs layer, such as Co, Fe, Ni, or an alloy thereof. A structure such that a high Bs and a high spin polarization rate are achieved may be obtained by stacking a Heusler alloy such as Co—Fe—Ge, Co—Mn—Ge, Co—Fe—Al, Co—Fe—Si, Co—Mn—Si, and Co—Fe—Si as a material with high spin injection efficiency, and Co, Fe, Ni, or an alloy thereof. Further, a material that exhibits negative perpendicular magnetic anisotropy, such as Co/Fe or Co/Ir, may be used. As to the film thickness of the oscillation layer 7, a high Bs and a thick film may be desirable to increase the high frequency magnetic field strength. However, as the film thickness is increased, the current density required for oscillation increases, and also the demagnetization field in the film thickness direction is lowered, so that the oscillation layer magnetization becomes more likely to be oriented in the film plane perpendicular direction. Accordingly, in consideration of the magnetic field strength and oscillation feasibility, the film thickness of the oscillation layer 7 is preferably in a range of from 3 nm to 20 nm.

On the oscillation layer 7, Ru (3) was stacked as the capping layer 8 according to the present embodiment. The capping layer 8 is required to block magnetic coupling with the trailing shield 9 disposed above and to prevent milling damage during processing. As a material that satisfies such purposes, Cr, Ti, Pt, Rh, Pd, Ir, Ta, and the like may be used besides Ru (3).

The trailing shield 9 is required to make the magnetic field gradient of the main magnetic pole 1 steep. However, if the high frequency magnetic field strength of the spin torque oscillator is sufficiently high, the trailing shield 9 may not be required.

An electric current that flows in the spin torque oscillator is caused to flow from the second magnetic layer 5 toward the oscillation layer 7. The electrons injected from the trailing shield 9 through the capping layer 8, the oscillation layer 7, the spin conduction layer 6, the second magnetic layer 5, the coupling layer 4, the first magnetic layer 3, the underlayer 2, and the main magnetic pole 1 are reflected by an interface of the spin conduction layer 6 and the second magnetic layer 5, and the reflected electrons provide a spin torque to the oscillation layer 7. By the reflection at the interface, due to a spin interaction with the magnetization in the second magnetic layer 5 indicated by an arrow in FIG. 1, the spin torque is supplied to the oscillation layer 7 as a torque that would align antiparallel to the magnetization of the second magnetic layer 5. Oscillation occurs in a state in which the spin torque and a damping torque are balanced. The magnitude of the damping torque is determined by the sum of the magnetic anisotropy of the oscillation layer 7 in the film plane perpendicular direction and the leakage magnetic field that passes from the main magnetic pole 1 through to the trailing shield 9.

Figure 2:
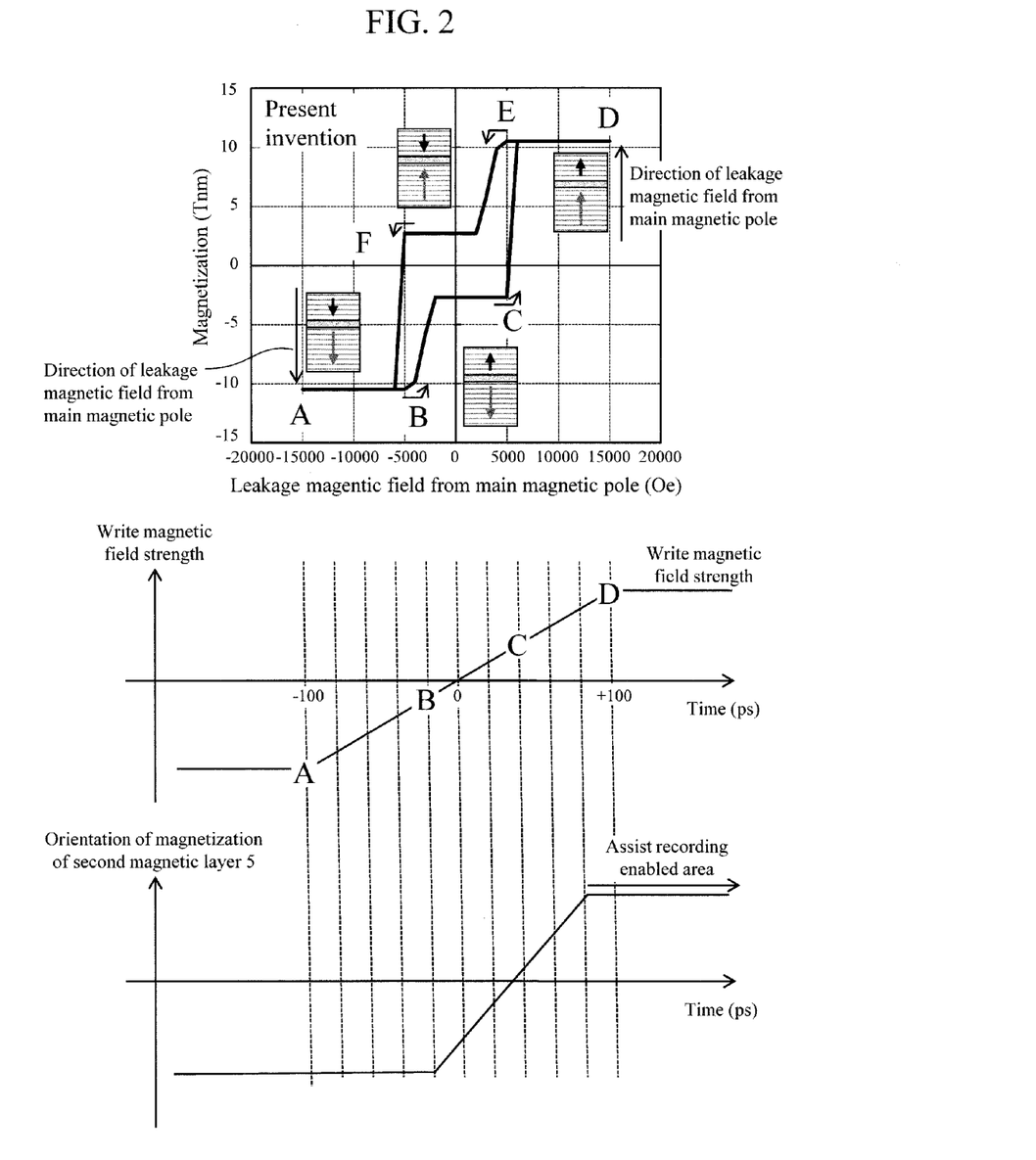
FIG. 2 illustrates a magnetization behavior obtained by a structure according to a first embodiment of the present invention.

FIG. 2 shows the result of a simulation of pinned layer magnetization reversal using the material parameters according to the present embodiment. The simulation, based on the assumption that the leakage magnetic field from the main magnetic pole 1 enters the film plane of the spin torque oscillator uniformly perpendicularly, shows the change in magnetization of the spin injection layer per period that is observed when the leakage magnetic field strength from the main magnetic pole 1 is changed from −15 kOe to +15 kOe and back to −15 kOe periodically, using signs A to F representing the time sequence.

In the spin torque oscillator, spin torque oscillation occurs when the second magnetic layer 5 is oriented in the same direction as the leakage magnetic field from the main magnetic pole 1. In the magnetization state A, there is steady oscillation. The oscillation stops upon passing B, and magnetization reversal of the second magnetic layer 5 starts before the sign of the leakage magnetic field from the main magnetic pole 1 is reversed. At this point, if the speed of magnetization reversal of the second magnetic layer 5 is 100 ps and the rise speed of magnetization of the main magnetic pole is 200 ps, the spin torque oscillator enters steady oscillation state and assisted magnetic recording becomes possible 20 ps before the write magnetic field strength saturates.

Figure 3:
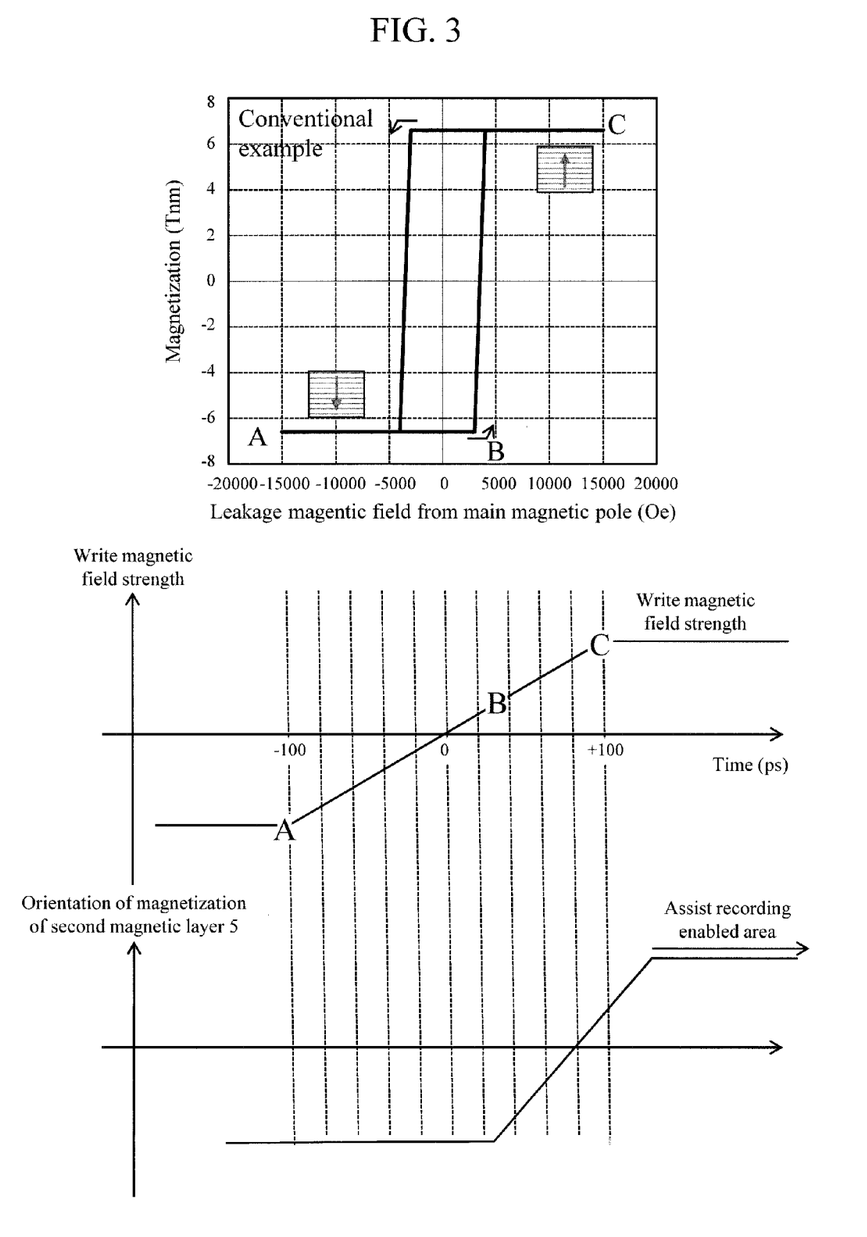
FIG. 3 illustrates a magnetization behavior obtained by a single-layer spin injection layer structure according to a conventional example.

As a comparative example, FIG. 3 shows the magnetization reversal behavior of a conventional spin torque oscillator having only the first magnetic layer 3 as a pinned layer. In the case of such a pinned layer, magnetization reversal of the spin injection layer does not occur until the leakage magnetic field strength from the main magnetic pole reaches +4 kOe. Thus, when the speed of magnetization reversal of the first magnetic layer 3 is equal to the speed of magnetization reversal of the second magnetic layer 5 at 100 ps, by the time the spin torque oscillation is in steady oscillation state, approximately 30 ps will have already elapsed after the write magnetic field strength saturated.

It is seen from FIGS. 2 and 3 that by using the configuration according to the present embodiment, the assisted recording enabled time can be extended by 50 ps compared with the conventional configuration. According to the present embodiment, the assisted recording enabled time can be extended without fail compared with the single-layer pinned layer irrespective of the rise time of the write magnetic field, so that the error rate can be improved by that much.

Figure 4:
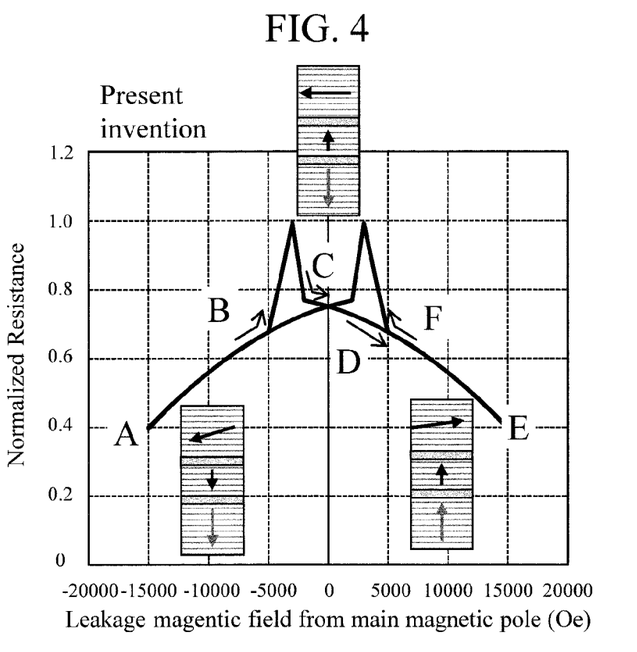
FIG. 4 shows a magneto-resistive effect curve obtained by the structure according to the first embodiment of the present invention.
Figure 5:
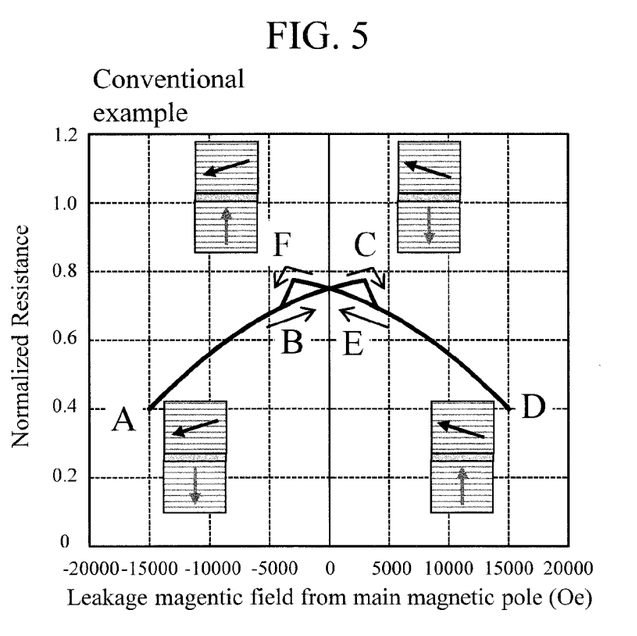
FIG. 5 shows a magneto-resistive effect curve obtained by the single-layer spin injection layer structure according to the conventional example.

FIG. 4 shows the magneto-resistive effect curve of the spin torque oscillator fabricated in the present embodiment. FIG. 5 shows the magneto-resistive effect curve of the conventional spin torque oscillator using only the first magnetic layer 3 as the spin injection layer. The signs A to F indicate the order of sweeping of magnetization. A comparison of FIGS. 4 and 5 shows that, in the configuration of the present embodiment shown in FIG. 4, a high resistance portion of the magneto-resistive effect curve is observed during the transition from B to C of the magnetization curve, whereas in the conventional configuration shown in FIG. 5, a high resistance portion of the magneto-resistive effect curve is observed for the first time in the state C after the sign of the leakage magnetic field from the main magnetic pole is reversed. Thus, the effect of the present invention can be seen from such difference.

Figure 6:
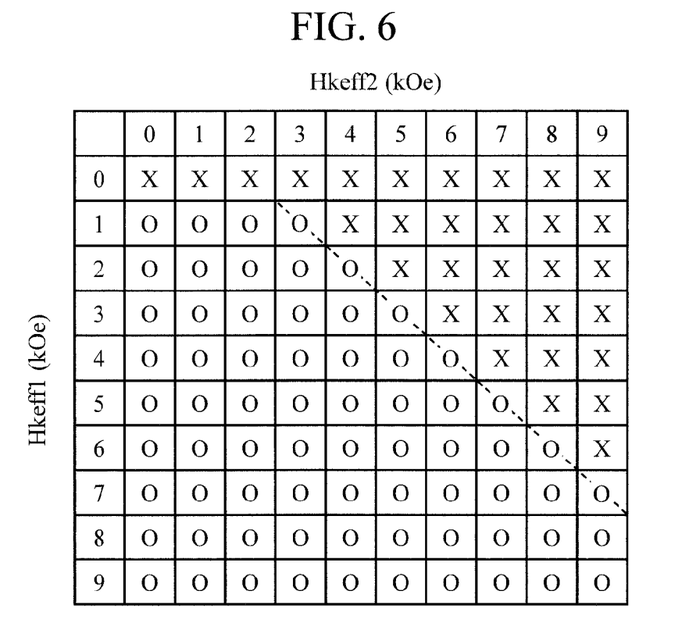
FIG. 6 illustrates a condition under which high speed magnetization reversal can be obtained by the structure according to the first embodiment.

FIG. 6 illustrates whether the second magnetic layer 5 is reversed temporally sooner when the effective magnetic anisotropy field $Hk_{eff1}$ of the first magnetic layer 1 and the effective magnetic anisotropy field $Hk_{eff2}$ of the second magnetic layer 5 are changed compared with when only the first magnetic layer 3 is used as the spin injection layer. In the figure, "O" indicates that a high speed reversal effect is obtained, and "X" indicates the absence of the quick reversal effect. According to the present embodiment, the product of the saturation magnetic flux density and the film thickness of the first magnetic layer 3 is Bs1×t1=6.6 nmT, and the product of the saturation magnetic flux density and the film thickness of the second magnetic layer 5 is Bs2×t2=3.9 nmT. The antiferromagnetic coupling strength J of the coupling layer 4 is 1 erg/cm². As shown in FIG. 6, according to the present embodiment, the high speed reversal effect is obtained in the range of Bs1×t1≥Bs2×t2 and $Hk_{eff1}>Hk_{eff2}$.

Figure 7:
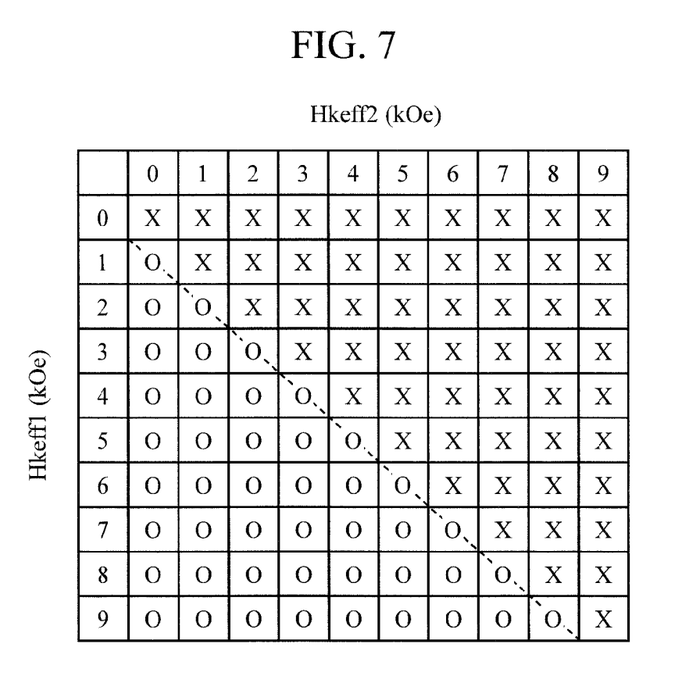
FIG. 7 illustrates a condition under which high speed magnetization reversal can be obtained when $Bs1 \times t1 = Bs2 \times t2$.

FIG. 7 corresponds to FIG. 6 when Bs1×t1=Bs2×t2=6.6 nmT, i.e., when the product of the saturation magnetic flux density and the film thickness is the same for the first magnetic layer and the second magnetic layer. As in the case of FIG. 6, FIG. 7 investigates the condition under which the high speed reversal effect for the second magnetic layer 5 is obtained when the effective magnetic anisotropy field $Hk_{eff1}$ of the first magnetic layer 1 and the effective magnetic anisotropy field $Hk_{eff2}$ of the second magnetic layer 5 are changed, compared with when only the first magnetic layer 3 is used as the spin injection layer. The antiferromagnetic coupling strength J of the coupling layer 4 is 1 erg/cm². When Bs×t is the same for the first magnetic layer 3 and the second magnetic layer 5, the respective magnetizations tend to undergo magnetization reversal while mutually having relative angles, so that the situation may be considered least likely to cause high speed magnetization reversal of the second magnetic layer 5. However, even in such a situation, the high speed reversal effect is obtained when $Hk_{eff1}>Hk_{eff2}$ is satisfied.

Thus, it is seen that in the configuration according to the present embodiment, the high speed magnetization reversal effect can be obtained in the range of Bs1×t1≥Bs2×t2 and $Hk_{eff1}>Hk_{eff2}$.

Second Embodiment

Figure 8:
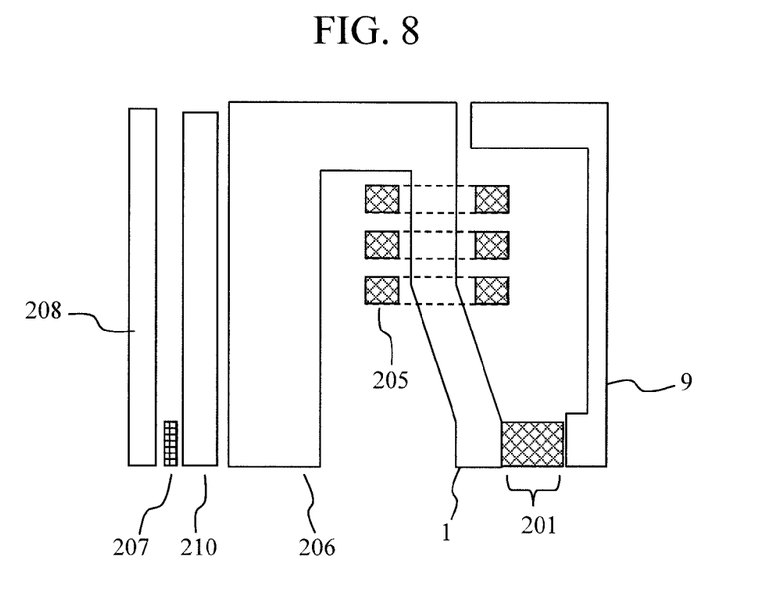
FIG. 8 schematically shows an example of a magnetic head equipped with a spin torque oscillator.

FIG. 8 is a schematic cross sectional view of a magnetic head equipped with the spin torque oscillator described in the first embodiment.

The magnetic head includes a recording head portion and a reproducing head portion. The recording head portion includes an auxiliary magnetic pole 206, a spin torque oscillator 201 disposed between a main magnetic pole 1 and a trailing shield 9, a coil 205 for magnetizing the main magnetic pole 1, and the like. A recording field is generated by the main magnetic pole 1. The reproducing head portion includes a reproducing sensor 207 disposed between a lower shield 208 and an upper shield 210, and the like. While not shown, a magnetizing current for the coil 205, a drive current for the reproducing sensor 207, and an applied current for the spin torque oscillator 201 are supplied via current supply terminals provided for the respective constituent elements.

As shown in FIG. 8, the trailing shield 9 extends toward the main magnetic pole 1 at an upper position in an element height direction, thus mutually forming a magnetic circuit.

However, they are electrically insulated from each other at the upper position in the element height direction. As a result, a series electric circuit is formed from the main magnetic pole 1 through the spin torque oscillator 201 to the trailing shield 9. Thus, by connecting electrodes to the main magnetic pole 1 and the trailing shield 9, the spin torque oscillator 201 can be supplied with a flow of an electric current necessary for spin torque oscillation.

Third Embodiment

Figure 9:
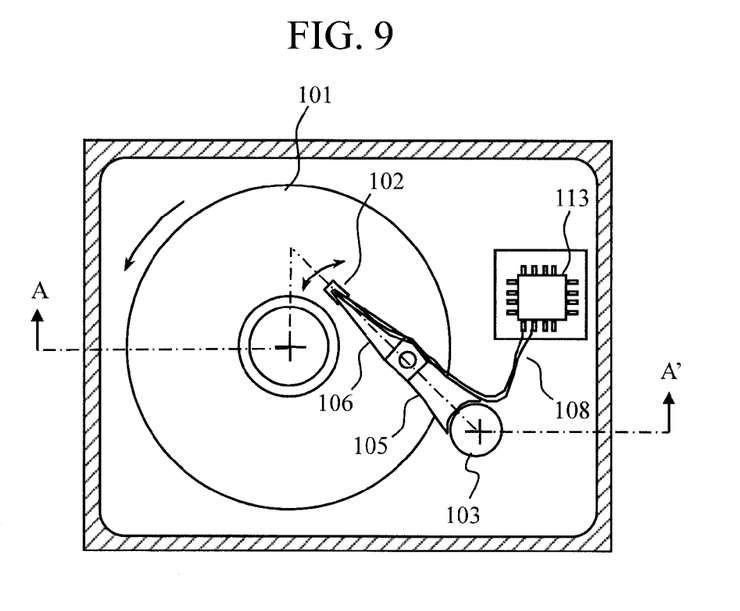
FIG. 9 is a schematic top-plan view showing an overall configuration example of a magnetic recording/reproducing apparatus.
Figure 10:
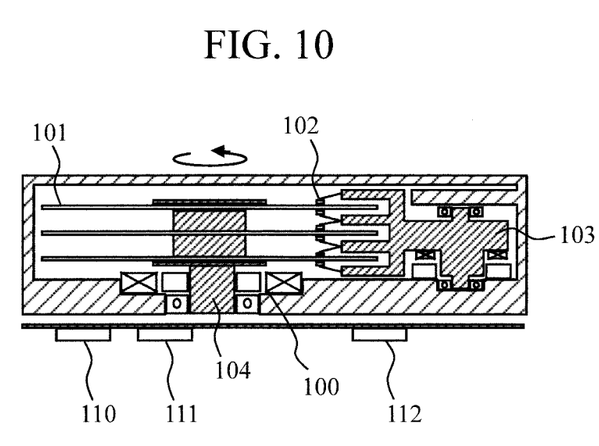
FIG. 10 is a schematic cross sectional view of the magnetic recording/reproducing apparatus.

A magnetic recording/reproducing apparatus was configured by assembling the magnetic head according to the second embodiment and a magnetic recording medium. FIG. 9 is a schematic top plan view illustrating an overall configuration example of the magnetic recording/reproducing apparatus according to the present embodiment. FIG. 10 is a schematic cross sectional view taken along A-A' of FIG. 9.

A magnetic recording medium (magnetic disk) 101 is fixed on a rotational bearing 104 and rotated by a motor 100. While the example illustrated in FIG. 9 has three magnetic disks and six magnetic heads, one or more magnetic disks and one or more magnetic heads may be provided. The magnetic recording medium 101 is a disk on both surfaces of which recording layers are formed. A slider 102 is moved on a rotating recording medium surface in a substantially radial direction, and has the magnetic head mounted at the end. A suspension 106 is supported on a rotary actuator 103 via an arm 105. The suspension 106 has the function to press the slider 102 onto the magnetic recording medium 101 with a predetermined load, or to separate the slider 102 from the magnetic recording medium. The magnetic head mounted on the slider 102 is positioned at a desired track on the magnetic recording medium 101 by driving the arm 105 with the rotary actuator 103.

Electric currents for driving the respective constituent elements of the magnetic head are supplied from an IC amplifier 113 via wires 108. Processing of a recording signal supplied to the recording head portion and a reproduction signal detected from the reproducing head portion is performed by a read/write channel IC 112. Control operations of the magnetic recording/reproducing apparatus as a whole are implemented by a processor 110 executing a disk control program stored in a memory 111. Thus, according to the present embodiment, the processor 110 and the memory 111 constitute a so-called disk controller.

Regarding the above configuration, the result of a test of the magnetic head according to the present invention and the magnetic recording/reproducing apparatus equipped with the same indicated a sufficient output, a high recording density, and good operational reliability.

The present invention is not limited to the foregoing embodiments and may include various modifications. For example, the foregoing embodiments have been set forth to aid the description of the present invention in an easily understandable manner, and the present invention is not necessarily limited to have all of the described configurations. A part of the configuration of a certain embodiment may be substituted with the configuration of another embodiment, or the configuration of the other embodiment may be added to the configuration of the certain embodiment. A part of the configuration of each embodiment may be modified by addition, deletion, or substitution with another configuration.

REFERENCE SIGNS LIST

1 Main magnetic pole
2 Underlayer
3 First magnetic layer
4 Coupling layer
5 Second magnetic layer
6 Spin conduction layer
7 Oscillation layer
8 Capping layer
9 Trailing shield
100 Motor
101 Recording medium
102 Slider
103 Rotary actuator
104 Rotational bearing
105 Arm
106 Suspension
108 Wires
110 Processor
111 Memory
112 Channel IC
113 IC amplifier
201 Spin torque oscillator
205 Coil
206 Auxiliary magnetic pole
207 Reproducing sensor
208 Lower shield
210 Upper shield

What is claimed is:

1. A magnetic recording head comprising:
a main magnetic pole configured to generate a recording field; and
a spin torque oscillator,
wherein:
the spin torque oscillator includes a stacked spin injection layer and a high frequency magnetic field generation layer;
the stacked spin injection layer has a stacked structure including a first magnetic layer, a coupling layer, and a second magnetic layer that are stacked in the order mentioned from a far side as viewed from the high frequency magnetic field generation layer;
the spin torque oscillator is configured so that magnetization of the first magnetic layer and magnetization of the second magnetic layer are coupled antiparallel to each other; and
the following relationship is satisfied:

$$Bs1 \times t1 \geq Bs2 \times t2 \text{ and } Hk_{\mathit{eff}1} > Hk_{\mathit{eff}2}$$

where $Bs1 \times t1$ is the product of a saturation magnetic flux density and a film thickness of the first magnetic layer, $Bs2 \times t2$ is the product of a saturation magnetic flux density and a film thickness of the second magnetic layer, $Hk_{\mathit{eff}1}$ is an effective magnetic anisotropy field of the first magnetic layer, and $Hk_{\mathit{eff}2}$ is an effective magnetic anisotropy field of the second magnetic layer,
where the effective magnetic anisotropy field is defined as the sum of a crystalline magnetic anisotropy magnetic field and a shape magnetic anisotropy magnetic field.

2. The magnetic recording head according to claim 1, wherein the first magnetic layer and the second magnetic layer are comprised of perpendicular magnetic anisotropy films having a magnetic easy axis in a direction perpendicular to a film stacked plane.

3. The magnetic recording head according to claim 2, wherein the perpendicular magnetic anisotropy film is comprised of an alloy film of Co and Pt or Co and Pd, or a multilayer film of alternately stacked layers of Co and Pt, Co and Pd, or Co and Ni.

4. The magnetic recording head according to claim 1, wherein the spin torque oscillator is configured so that an electric current is applied from the second magnetic layer toward the high frequency magnetic field generation layer.

* * * * *